United States Patent
Hawkins et al.

(10) Patent No.: US 6,519,287 B1
(45) Date of Patent: Feb. 11, 2003

(54) METHOD AND APPARATUS FOR ENCODING AND DECODING VIDEO SIGNALS BY USING STORAGE AND RETRIEVAL OF MOTION VECTORS

(75) Inventors: David J. Hawkins, Austin, TX (US); Bruce A. Augustine, Lake in the Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/114,568

(22) Filed: Jul. 13, 1998

(51) Int. Cl.$^7$ .............................. H04N 7/12; H04B 1/66
(52) U.S. Cl. ................................................ 375/240.16
(58) Field of Search ........................... 375/240, 240.01, 375/240.02, 240.15, 240.16, 240.17, 240.18, 240.24; 348/384.1, 390.1, 402.1, 405.1, 415.1, 416.1, 417.1, 616, 699, 700; 382/232, 234, 236, 238, 250; H04B 1/66; H04N 7/12

(56) References Cited

U.S. PATENT DOCUMENTS

| | | | | |
|---|---|---|---|---|
| 5,442,402 A | * | 8/1995 | Sohn et al. | 348/416.1 |
| 5,552,831 A | * | 9/1996 | Machia et al. | 348/416.1 |
| 5,805,223 A | * | 9/1998 | Shikakura et al. | 348/402.1 |
| 5,841,475 A | * | 11/1998 | Kurahara et al. | 348/409.1 |
| 5,844,628 A | * | 12/1998 | Hamano et al. | 348/616 |
| 5,973,755 A | * | 10/1999 | Gabriel | 348/699 |
| 5,974,184 A | * | 10/1999 | Eifrig et al. | 382/236 |

OTHER PUBLICATIONS

Gary J. Sullivan, et al., "Methods of Reduced–Complexity Overlapped Block Motion Compensation", IEEE 1994, pp. 957–961.

Tien–Ying Kuo, et al., "Fast Motion Vector Search for Overlapped Block Motion Compensation (OBMC)", IEEE 1997, pp. 948–952.

Motorola, Inc. 1997, Motorola Semiconductor Technical Data, System Preview: QORUS™ Multi–Standard Video Conferencing System, Doc. Order #QORUS/D, pp. 1–16.

International Telecommunication Union (ITU–T) Draft H.263, "Telecommunication (Jul. 5, 1995) Standardization Sector of ITU", Particularly Annex F (Advanced Prediction Node) with red marker.

* cited by examiner

Primary Examiner—Chris Kelley
Assistant Examiner—Tung Vo
(74) Attorney, Agent, or Firm—Robert L. King; Joanna G. Chiu

(57) ABSTRACT

A system (10) which encodes and decodes video signals in accordance with a compression standard, such as H.263, efficiently stores and retrieves motion vectors associated with the signals. An encoder (16) and a decoder (22) each use a motion vector storage and retrieval circuit (38, 72) which addresses a respective SRAM array (52, 52'). Advanced Prediction Mode for a video signal is implemented by storing only a minimum number of motion vectors by eliminating storage of motion vectors which are not needed for a real-time current calculation. Storage of selected top motion vectors associated with predetermined macroblocks of video information is avoided to gain a memory savings.

21 Claims, 7 Drawing Sheets

METHOD AND APPARATUS FOR ENCODING AND DECODING VIDEO SIGNALS BY USING STORAGE AND RETRIEVAL OF MOTION VECTORS

TECHNICAL FIELD

This invention generally relates to video communications, and more particularly, to compression and decompression of video images.

BACKGROUND OF THE INVENTION

Video phones and video conferencing equipment used by most businesses and households require very high compression ratio due to the bandwidth limitations inherent in today's telephone networks. In response to this requirement, the H.263 International Standard for Low Bit Rate Video Communications was developed. The standard was immediately adopted by the video industry. Advantages of the H.263 International Standard include the implementation of an optional technique called Advanced Prediction Mode (APM). APM significantly improves the video image by removing artifacts introduced during motion estimation. A drawback to APM is that it is very difficult and inefficient to implement in hardware. As a result, the first implementations of advance prediction mode were in software only.

One of the H.263 techniques for compressing video is to use motion estimation. Motion estimation processes video by sending motion vectors to the decoder instead of actual pixels. The decoder takes the motion vectors and uses them to recreate a current frame by accessing blocks of data, pointed by the motion vectors, from the previously decoded frame. In H.263 APM mode, a single motion vector can be sent in place of each of 8×8 block of pixels. The APM option requires the motion vectors representing each 8×8 block to be averaged with those of surrounding blocks. This reduces the blocking artifacts introduced in the motion estimation process. Unfortunately, averaging the motion vectors from surrounding macroblocks turns out to be both memory and hardware intensive for several reasons. Firstly, retrieving motion vectors from surrounding blocks means having to store a large number of motion vectors in RAM. A requirement to retrieve the motion vectors above the current block requires storing an entire row of motion vectors which is very memory intensive. Secondly, the H.263 standard defines the APM mode to require storing and retrieving motion vectors for two separate functions: Overlapped Block Motion Compensation (OBMC) and predictor calculations. These functions are not easily combined because the OBMC function lags behind the predictor function by one macroblock of decoding time, which forces the functions to operate in different time frames. Thirdly, both the OBMC and predictor calculations require four separate address patterns each. Therefore, there are eight separate addressing schemes which are required. However, none of the addressing schemes are in a linear order, or any other pattern which is easily addressable.

Due to the problems mentioned above, it is very difficult to design a hardware efficient implementation of the APM mode defined by the H.263 standard. Software implementations of the APM mode are advantageous due to the availability of a very large amount of memory and system resources which are required to implement this function. However, software implementations suffer from the disadvantage of running much slower, sacrificing frame rate and image quality obtainable by hardware implementations.

DETAILED DESCRIPTION OF THE INVENTION

Figure 1:
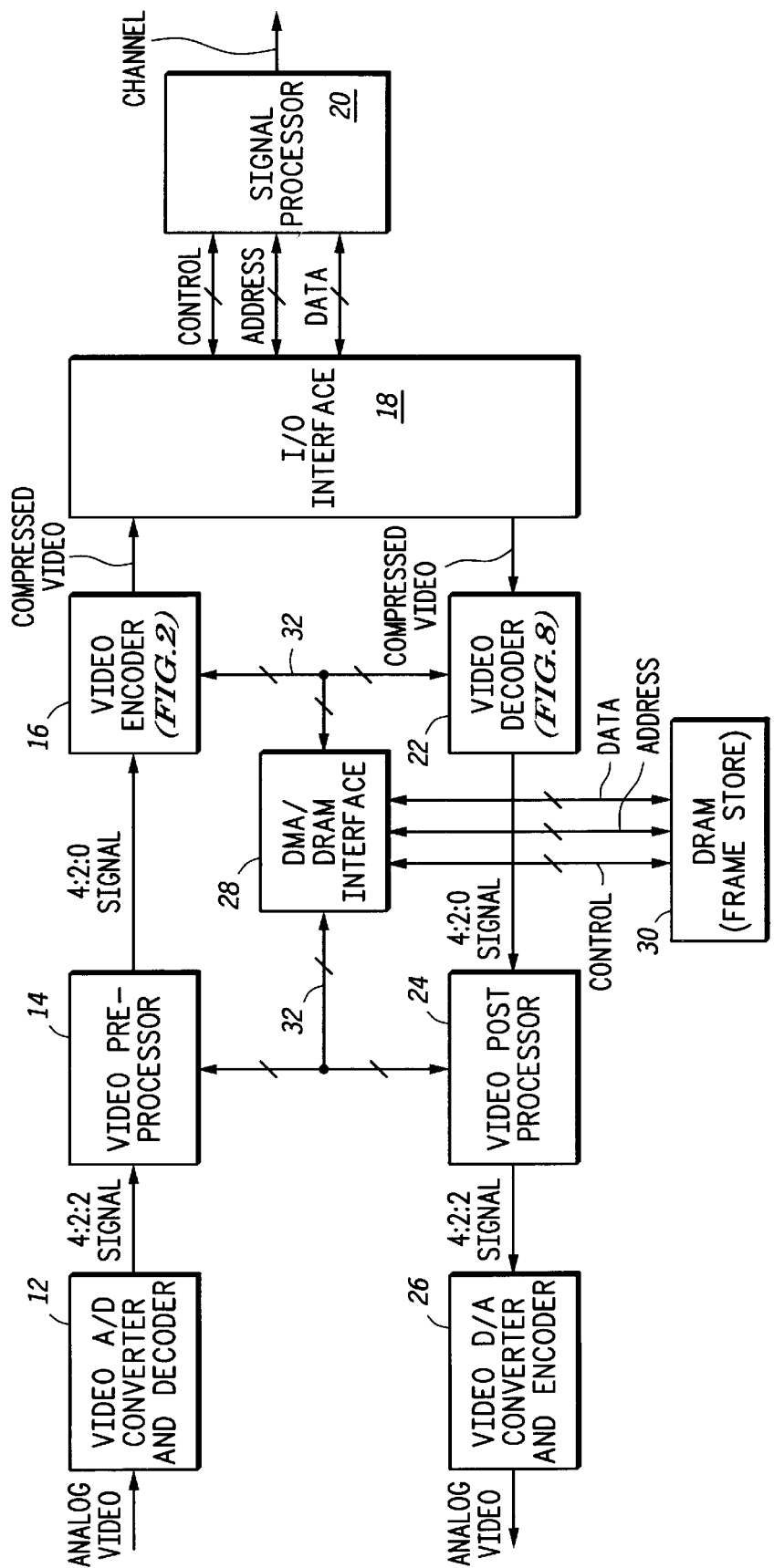
FIG. 1 illustrates in block diagram form a video communication system for use with the present invention.

Illustrated in FIG. 1 is a block diagram of a video codec (encoder/decoder 10) apparatus in accordance with the present invention. The present invention overcomes the problems mentioned above and allows APM to be implemented efficiently in silicon. A video A-D converter and decoder 12 has an input for receiving an analog video signal and an output which provides a signal which is in a 4:2:2 video format. The 4:2:2 signal is connected to an input of a Video Preprocessor 14 which provides the signal in a 4:2:0 video format. An output of video preprocessor 14 is connected to an input of Video Encoder 16 which will be further described in detail in FIG. 2. Video Encoder 16 provides a compressed video bitstream to an input/output (I/O) Interface circuit 18. The I/O Interface 18 is coupled to a signal processor 20 via control, address and data buses. The I/O Interface 18 functions to interface the compressed video bitstream with the particular type of signal processor utilized in Signal Processor 20. I/O Interface circuit 18 is also coupled to an input of a video decoder 22 which provides a compressed video bitstream to Video Decoder 22. An output of Video Decoder 22 is connected to an input of a post processor 24. The output of Video Decoder 22 is in a 4:2:0 video format. An output of Post Processor 24 is connected to an input of a Video D-A converter and Encoder 26 in a 4:2:2 video format. An output of Video D-A Converter and Encoder 26 provides an analog video output. Additionally shown is a direct memory access (DMA)/ dynamic random access memory (DRAM) Interface circuit 28. DMA/DRAM Interface circuit 28 is coupled via an internal bus 32 to each of Video Preprocessor 14, Video Encoder 16, Video Decoder 22, and Post Processor 24. The DMA/DRAM Interface circuit 28 is coupled to a DRAM 30 via control, address and data buses. Video Codec 10 functions to receive an analog video signal, convert it into two different video formats via Video A-D Converter and Decoder 12 and Video Preprocessor 14, and provide a 4:2:0 signal to a video encoder which functions to compress the signal into a compressed video bitstream. The compressed video bitstream is used by Signal Processor 20, which functions as a host and provides the compressed video bitstream to a channel for transmission. Depending upon what type of channel is used, Signal Processor 20 may change the compressed video signal to an analog format or leave it in a digital format. I/O Interface 18 also functions to provide the compressed video bitstream, which is received over the channel via the Signal Processor 20, to Video Decoder 22. Video Decoder 22 decompresses the video bitstream into a 4:2:0 video format which is used by the Post Processor 24. Post Processor 24 converts the 4:2:0 format into a 4:2:2 format used by Video D/A converter 26. Video D/A converter 26 provides an analog output which can be accepted by a conventional television or video monitor. The form of Video Codec 10 is substantially conventional as illustrated. In other words, existing integrated circuit products may be used to implement Video A-D converter and Decoder 12, Video Preprocessor 14, Post Processor 24 and Video D-A Converter and Encoder 26. However, the implementation and efficiency of Video Encoder 16 and Video Decoder 22 may vary depending upon the application. It is the specific implementation of the Video Encoder 16 and Video Decoder 22 which this invention deals with.

Figure 2:
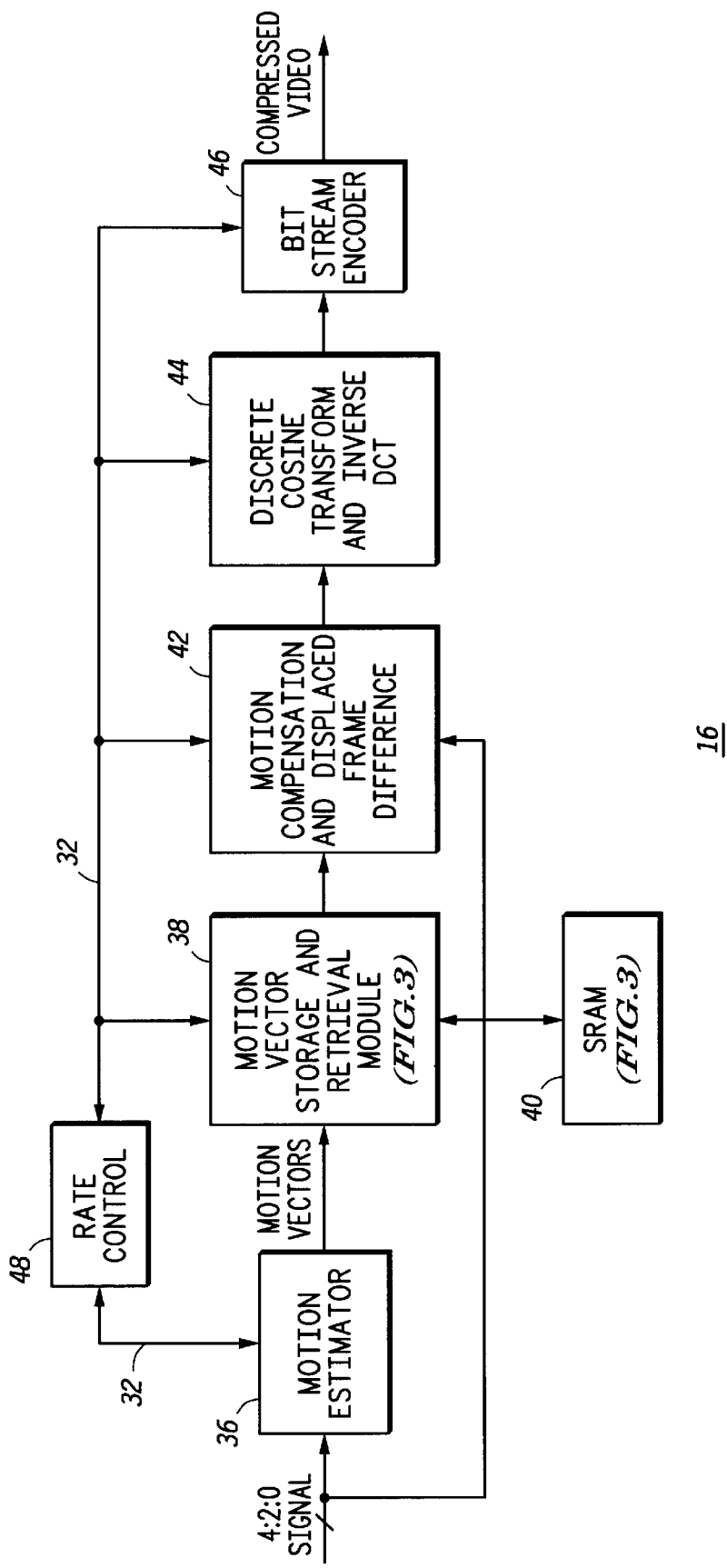
FIG. 2 illustrates in block diagram form a video encoder in accordance with the present invention.

Illustrated in FIG. 2 is a detailed block diagram of Video Encoder 16 of FIG. 1. Video Encoder 16 generally comprises a Motion Estimator circuit 36 which has an input for receiving a video signal in 4:2:0 video format. The output of Motion Estimator 36 provides a plurality of motion vectors to a Motion Vector Storage and Retrieval Module 38. Module 38 has an output which is connected to an input of a Motion Compensation and Displaced Frame Difference circuit 42. An output of Motion Compensation and Displaced Frame Difference circuit 42 is connected to an input of a Discrete Cosign Transform and Inverse Discrete Cosign Transform (IDT/DCT) circuit 44 or module. In general, IDT/DCT circuit 44 performs a transform based compression/decompression algorithm such as a wavelet or a discrete cosine transform. An output of the Discrete Cosign Transform and Inverse DCT circuit 44 is connected to an input of a Bitstream Encoder 46 which provides a compressed video output bitstream. A Rate Control circuit 48 is connected via the internal bus 32, which was also illustrated in FIG. 1, to each of Motion Estimator 36, Motion Compensation and Displaced Frame Difference circuit 42 and Discrete Cosign Transform and Inverse DCT circuit 44.

In operation, Video Encoder 16 functions by performing motion estimation of a current frame from a previous frame of pixel information. The Motion Estimator 36 provides a plurality of motion vectors. The motion vectors represent the displacement of 8×8 pixel blocks between the previous and current frame. The Motion Vector Storage and Retrieval Module 38 receives the motion vectors. As will be further described in connection with FIG. 3, Module 38 functions to retrieve and store motion vectors required to implement the Advanced Prediction Mode in video standards such as the H.263 international standard. Once Module 38 has retrieved and stored such motion vectors, Module 38 provides two types of motion vectors at its output to Motion Compensation and Displaced Frame Difference circuit 42. A first type of motion vector provided is used for Overlapped Block Motion Compensation. The second type of motion vectors provided is the motion vectors used for previous frame reconstruction and motion compensation. Motion Compensation and Displaced Frame Difference circuit 42 takes these two types of motion vectors and performs two functions: Displaced frame difference and motion compensation. The motion compensation function uses the two types of motion vectors mentioned above to duplicate the decoding of the remote decoder. The motion compensation function provides a reconstructed reference frame for the Motion Estimator 36 via bus 32. This frame, also referred to as a previous or reconstructed frame, is an exact duplicate of what will be decoded by the remote decoder. It will be used by the Motion Estimator 36 as the reference frame for motion estimation when the Video Encoder 16 encodes the next frame. The displaced frame difference function subtracts the motion estimated frame from the original (reference) frame and provides the difference to the Discrete Cosign Transform and Inverse DCT circuit 44. The Discrete Cosign Transform and Inverse DCT circuit 44 performs a lossy transform based compression function. The DCT/IDCT 44 output and the motion vectors from Motion Estimator 36 are provided to the Bitstream Encoder 46. Bitstream Encoder 46 arranges the data in compliance with the H.263 standard and provides a compressed video bitstream output to the channel. In addition to being sent over the channel, the compressed output of DCT/IDCT circuit 44 is decompressed using the inverse transform function of the same DCT/IDCT circuit 44. This decompressed output is then provided, via bus 32, to the same Motion Compensation and Displaced Frame Difference circuit 42. This information is used by the displaced frame difference function to undo its prior subtraction and recreate a reference frame of the Motion Estimator 36 which is an exact duplicate of what will be decoded by the remote decoder on the other end of the channel.

Figure 3:
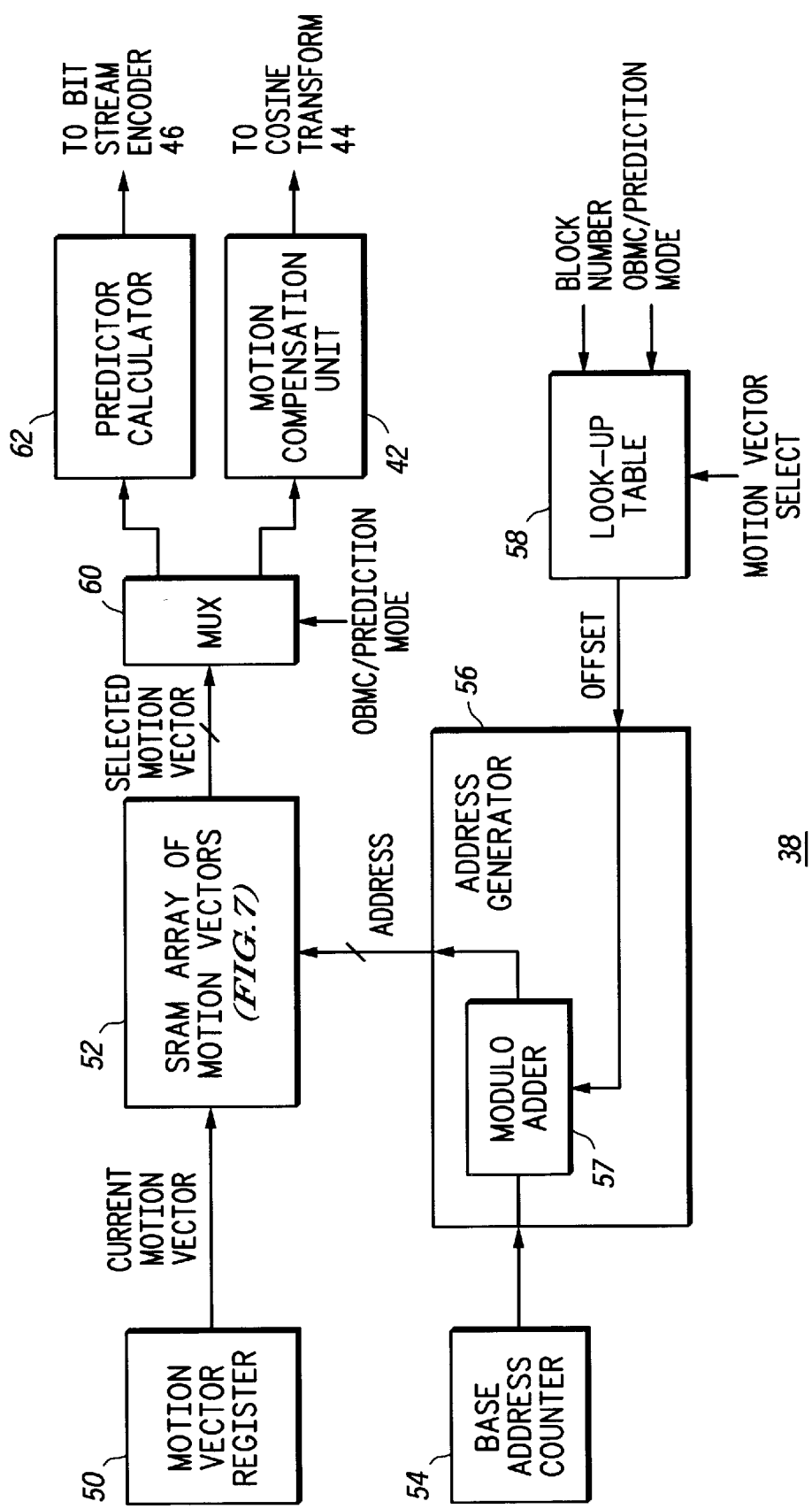
FIG. 3 illustrates in block diagram form the motion vector storage and retrieval circuitry of FIG. 2 in accordance with the present invention.

Illustrated in FIG. 3 is Motion Vector Storage and Retrieval Module 38 of FIG. 2 in accordance with the present invention. A Motion Vector Register 50 has an output for providing current motion vectors to an SRAM Array of Motion Vectors 52 which may be more generally referred to as a plurality of storage elements for storing motion vectors. A Base Address Counter 54, for generating a base address, is connected to an Address Generator 56. Address Generator 56 has a second input for receiving an offset value from a Look-up Table 58. Look-up Table 58 has a first input for receiving a block number. The block number represents one of four possible blocks within a macroblock as defined by most video standards. Look-up Table 58 has a second input for receiving an OBMC/predictor mode signal for implementing either the OBMC or predictor calculation modes necessary for the H.263 international standard. Look-up Table 58 has a third input for selecting the desired motion vector (Left, Above, Above-Right, Right, Bottom) as is further detailed in FIGS. 5 and 6. The motion vector selection is normally generated by a two-bit state machine (not shown). The state machine cycles through the four possible selections (Left, Above, Above-right and Right, Bottom) and is reset back to the beginning when a new macroblock is encoded. A Modulo Adder 57 has a first input for receiving the offset value from Look-up Table 58, a second input for receiving a base address from Base Address Counter 54, and an output for providing an address which is connected to the SRAM Array of Motion Vectors 52. The SRAM Array 52 has an output for providing selected motion vectors to a Multiplexer circuit 60. Multiplexer 60 has a first output connected to an input of a Predictor Calculator circuit 62. Multiplexer 60 functions in response to the OBMC/prediction mode control signal which is also used to select the proper offset values in Look-up Table 58. Multiplexer 60 has a second output which is connected to an input of a Motion Compensation unit 42. Motion Compensation unit 42 has an output which provides a signal to DCT/IDCT circuit 44 which was illustrated in FIG. 2. Before the operation of the Motion Vector Storage and Retrieval Module 38 is described, reference to FIGS. 4–6 will be made.

Figure 4:
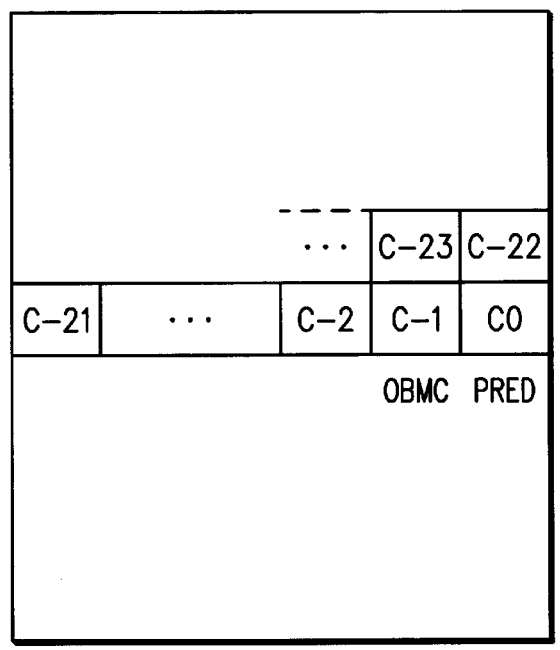
FIG. 4 illustrates in perspective form a macroblock layout of a row within a common intermediate format (CIF) size frame.

Illustrated in FIG. 4 is a macroblock layout of a row within a video frame of type common intermediate format (CIF). The macroblock layout has a plurality of rows of macroblocks. For convenience of illustration, only one row of macroblocks is provided in detail. Each row has twenty-two macroblocks, respectively labeled C0 through C-21. In the illustrated form, macroblock C0 represents a current macroblock time-wise. Immediately above macroblock C0 is macroblock C-22 which in the time domain is the macroblock from twenty-two macroblocks in the past. In order to obtain the greatest savings in hardware and memory, it is necessary to share and combine the memory used for the OBMC and predictor functions. The OBMC function must be delayed by one macroblock of time with respect to the predictor function. This fact forces the OBMC function to operate (store and retrieve motion vectors) on macroblock C-1, while the predictor function operates on macroblock C0. Delaying the OBMC function to macroblock C-1 is necessary due to an OBMC requirement which requires retrieving a motion vector to the immediate right (further described in connection with FIG. 6) of the macroblock on which the OBMC function is operating. If the OBMC function operates on macroblock C0, the "Right" motion vector would have to be retrieved from macroblock C+1, one macroblock in the future, which is not yet available. As is further described in connection with FIGS. 5 and 6, it is also necessary to retrieve motion vectors from the macroblocks "Above" the OBMC and predictor functions. It is important to note that the "Above" motion vectors were processed twenty-three macroblocks in the past for the OBMC function and twenty-two macroblocks in the past for the predictor function. Because of this fact, it is necessary to store the motion vectors of twenty-four (C0 through C-23) macroblocks.

Figure 5:
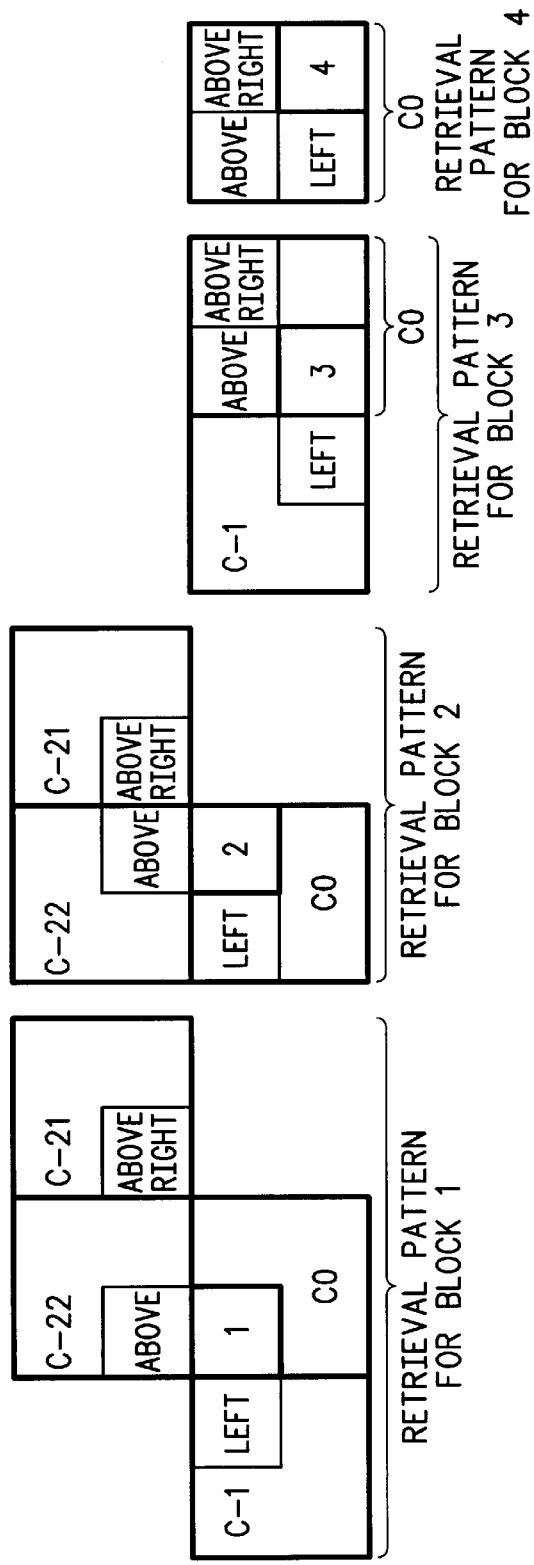
FIG. 5 illustrates the motion vector retrieval pattern for the predictor calculation in accordance with the H.263 standard.
Figure 6:
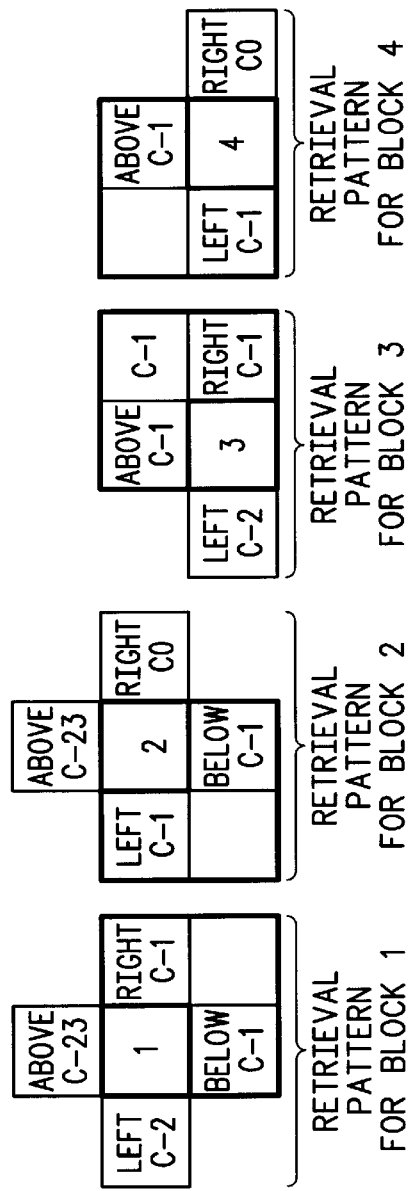
FIG. 6 illustrates the motion vector retrieval pattern for the OBMC function in accordance with the H.263 standard.

In FIGS. 5 and 6, the following nomenclature will be used: Big squares representing a 16×16 pixel macroblock are subdivided into four smaller 8×8 pixel blocks. Each 8×8 pixel block has its own motion vector associated with it. The four 8×8 pixel blocks, commonly referred to in the art as just "blocks", will be numbered Blocks 1, 2, 3 and 4. Block 1 is the upper left corner of the macroblock, block 2 is the upper right corner, block 3 is the lower left corner, and block 4 is the lower right corner. Processing a macroblock refers to either the encoding or decoding of that macroblock. The nomenclature "C-1" in FIGS. 5 and 6 refers to the macroblock that was processed one macroblock in the past. Likewise, the macroblock "C-21" refers to the macroblock that was processed twenty-one macroblocks in the past. "C0" refers to the current macroblock being processed. In FIG. 5 it is important to note that the motion vectors which need to be retrieved for block 1 within macroblock C0 are the Left, Above and Above-Right. The Left motion vector comes from block 2 within macroblock C-1. The Above motion vector comes from block 3 within macroblock C-22. The Above Right motion vector comes from block 3 within macroblock C-21. The retrieval pattern for block 2 within the current macroblock being processed is as follows: the Left motion vector is block 1 of the current block being processed (C0). The Above motion vector is block 4 of macroblock C-22. The Above-Right motion vector is block 3 of macroblock C-21. The retrieval pattern for block 3 within the current macroblock being processed also differs from blocks 1, 2, 3, and 4. The retrieval pattern for block 3 within the current block is as follows: the Left motion vector is block 4 in macroblock C-1. The Above motion vector is block 1 of the current macroblock being processed (C0), and the Above-Right motion vector is block 2 of the current macroblock being processed (C0). For block 4 within the current macroblock being processed, the Left motion vector is block 3 within the current macroblock C0. The Above motion vector is block 1 within the current macroblock C0, and the Above-Right motion vector is block 2 within the current macroblock C0. Again, it is important to note that the retrieval patterns for blocks 1, 2, 3 and 4 differ from each other. These patterns are defined in the H.263 standard.

The present invention also supports the retrieval of motion vectors for the OBMC function. This function has a separate retrieval pattern for each block within a macroblock as well. The OBMC function requires retrieving a Left, Above, Right and Below motion vector for each block within a macroblock. Again, it is important to note that the requirement to retrieve a motion vector to the right is difficult because the motion vector to the right of the current macroblock has not been processed yet. To retrieve the Right motion vector, it is necessary to delay the OBMC function by 1 macroblock in time. Therefore the OBMC function will operate on macroblock C-1, one macroblock behind the predictor function. The retrieval pattern for the OBMC function is as follows: For Block 1 the Left motion vector is block 2 of macroblock C-2. The Above motion vector is block 3 of macroblock C-23. The Right motion vector is block 2 of macroblock C-1, and the Below motion vector is block 3 macroblock C-1. For block 2 within the same OBMC motion vector being processed, the Left motion vector is block 1 within macroblock C-1. The Above motion vector is block 4 of macroblock C-23. The Right motion vector is block 1 of macroblock C0, and the Below motion vector is block 4 of macroblock C-1. For block 3 of the OBMC function, the Left motion vector is block 4 of macroblock C-2. The Above motion vector is block 1 of macroblock C-1. The Right motion vector is block 4 of macroblock C-1, and the Below motion vector is block 3 within macroblock C-1. For block 4 of the OBMC macroblock C-1, the Left motion vector is block 3 of macroblock C-1. The Above motion vector is block 2 of macroblock C-1. The Right motion vector is block 3 of macroblock C0, and the Below motion vector is block 4 of macroblock C-1.

Referring back to FIG. 3, Motion Vector Storage and Retrieval Module 38 functions as follows. The offset for the eight addressing schemes of both the OBMC and predictor modes, described above for FIGS. 5 and 6, is provided via the Look-up Table 58. Look-up Table 58 takes as its input the block number (1, 2, 3, 4) within a macroblock, the motion vector needed (Left, Right, etc.), and function mode (OBMC/Prediction) to select the proper offset for motion vector retrieval. The first mode to be implemented is the prediction mode. To implement the prediction mode, reference to FIG. 5 should be made. FIG. 5 illustrates four defined macroblock organizations in accordance with the H.263 international standard. Each macroblock has four motion vectors representing an 8×8 block within the macroblock. For the prediction mode, the H.263 international standard requires the retrieval of a Left, Above, and Above-Right motion vector for each of the four blocks contained in a macroblock. The retrieval pattern of the Left, Above, and Above-Right motion vectors for each block differs for the different blocks 1, 2, 3, and 4 within the macroblock. To implement the pattern, counter 54 provides a number between zero and fifty-three to Address Generator 56. Address Generator 56 multiplies the counter output by two to obtain the base address. The multiply-by-two is necessary in this implementation because two motion vectors are stored at each count. Look-up Table 58 outputs an offset value based upon the block number, mode and motion vector select. Modulo adder 57 adds the offset provided by Look-up Table 58 to the base address provided by Counter 54. The sum is an address which is used in communication with SRAM array 52 as a pointer. The address is used to retrieve the proper Left, Above, and Above-right motion vectors in accordance with the retrieval pattern of the H.263 standard. The Left, Above, and Above-Right motion vectors which are addressed in SRAM array 52 are selectively output by SRAM array 52 through a Multiplexer 60 (Mux). The selected motion vectors are provided to Predictor Calculator 62. The Predictor Calculator 62 functions to calculate the median of the selected Above, Above-Right and Left motion vectors. The resulting median, commonly known as the "predictor", is then provided to the Bitstream Encoder 46, where it is subtracted from the motion vector provided by the Motion Estimator 36. The result, commonly known in the art as the "difference", is sent over the channel. Implementations for Predictor Calculator 62 are commonly known in the art.

In the OBMC mode, Look-up Table 58 provides an offset value in accordance with the motion vector retrieval pattern (FIG. 6) for OBMC in compliance with the H.263 standard. Address Generator 56 functions analogous to the prior description on the predictor calculation in that an address is provided to SRAM array 52 which then provides selected motion vectors to Multiplexer 60. From Multiplexer 60, the OBMC motion vectors are provided to Motion Compensation unit 42 via Multiplexer 60. The Motion Compensation unit uses the OBMC motion vectors to build the reconstructed frame for the motion estimator.

It should be understood that a significant savings in RAM can be realized by noting that the motion vectors for the top of a macroblock, which are blocks 1 and 2, do not need to be saved past macroblock C-2. To understand this, refer to block 1 (OBMC function) of FIG. 6. FIG. 6 illustrates that the last time in which the set of top-half or portion (T-x) motion vectors is needed is for retrieval of the Left motion vector for block 1 within macroblock C-1. Therefore, only the set of bottom-half or portion motion vectors (B-x) is needed after macroblock C-2. This is because only the bottom-half or portion motion vectors from the macroblock above the macroblock being processed are needed to obtain the "Above" motion vectors.

Figure 7:
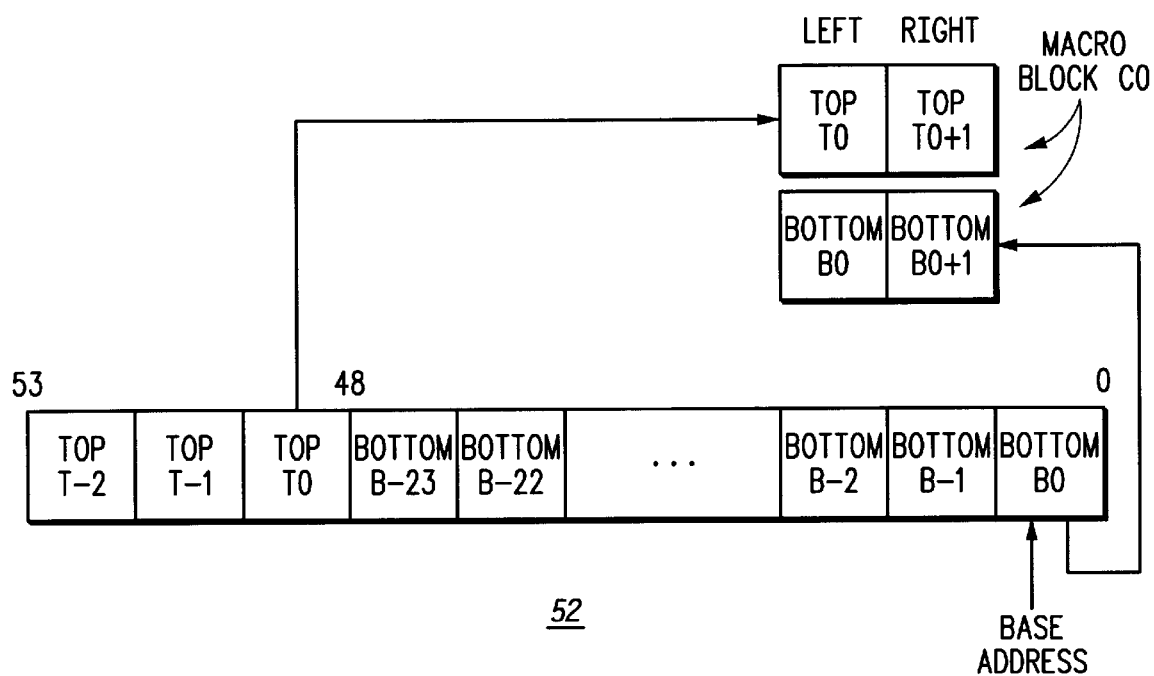
FIG. 7 illustrates memory allocation for the SRAM array of FIG. 3.

Illustrated in FIG. 7 is an example of the memory assignment associated with one form of SRAM array 52. In the illustrated form, a plurality of twenty-seven halves of macroblocks is provided in which each macroblock-half or portion contains the bottom or the top motion vectors of a macroblock. In the memory layout, there are twenty-four bottom-halves of macroblocks and three top-halves of macroblocks. The top-halves of the macroblocks store the motion vectors of blocks 1 and 2 of a macroblock. The bottom-halves of the macroblocks store the motion vectors of blocks 3 and 4 of the macroblock. More particularly, forty-eight address locations are allocated for the bottom motion vectors, and six address locations are allocated for the top motion vectors. This allocation corresponds to the fact that the bottom motion vectors need to be stored for twenty-three macroblocks of time, and the top motion vectors only need to be stored for three macroblocks of time. The nomenclature used in FIG. 7 is as follows: B0 represents the current macroblock being processed and is where the bottom motion vectors (Blocks 3 and 4) of the current macroblock being decoded are stored. B-1 is where the bottom motion vectors of the macroblock processed one macroblock in the past are stored. Likewise, T0 is where the top motion vectors (blocks 1 and 2) of the current macroblock are stored, and T-1 is where the top motion vectors of the macroblock processed one macroblock in the past are stored. It is important to note that this is a sliding/relative addressing scheme and not absolute addressing. The B0 and the B-1 macroblocks are not coded in absolute address 0 and absolute address 2 as would be in an absolute address scheme. It should be noted that the base address always points to the Left motion vector of B0 (the Bottom motion vectors of the current macroblock being processed). This is the same base address computed by multiplying two with the value in the Base Address Counter 54 of FIG. 3. It is important to note that as the counter advances, and we begin to process a new macroblock, the top motion vectors T0 age to become the top motion vectors T-1. The new top motion vector T0 overwrites the bottom motion vector B-23. Likewise, the new bottom motion vector B0 overwrites the old top motion vector T-2. In this way, a bottom motion vector is always overwriting a top motion vector, and a top motion vector always overwrites a bottom motion vector. Also note the storage allocated for the top and bottom motion vectors form two separate timelines.

An example of the above concepts is provided below. The example illustrates that if the current value of the counter is five, then base address ten in SRAM array 52 is where the bottom motion vectors of the current macroblock will be stored. The top motion vectors of the current macroblock will always be stored six addresses ahead of the counter, address sixteen in this example. The reason can be seen by looking carefully at the memory allocation of FIG. 7. Since the current count always points to B0, the sliding address space for T0 is reached by modulo adding six and wrapping around to T0. When the next macroblock is processed and the count advances to six, everything "ages" by one macroblock. Base address ten will now contain the bottom motion vectors from one macroblock in the past, while base address twelve contains the bottom motion vectors of the new current macroblock. It is important to notice that base address twelve previously contained the top motion vectors for macroblock C-2 (C-2 being the macroblock which contains the top motion vectors T-2 and bottom motion vectors B-2). The T-2 motion vectors which only needed to be stored for three macroblocks of time expired when the counter advanced to six and the bottom motion vectors B0 were written in its place.

EXAMPLE

| counter value 5 = base address 10 | | | | | | | |
|---|---|---|---|---|---|---|---|
| base address 0 . . . 4 | 6 | 8 | 10 | 12 | 14 | 16 | 18 . . . 52 |
| | B-2 | B-1 | B0 | T-2 | T-1 | T0 | B-23 |
| counter value 6 = base address 12 | | | | | | | |
| base address 0 . . . 4 | 6 | 8 | 10 | 12 | 14 | 16 | 18 . . . 52 |
| | B-3 | B-2 | B-1 | B0 | T-2 | T-1 | T0 |

In summation, the operation of the entire Motion Vector Storage and Retrieval Module 38 will be described based on the following example: If the Base Address Counter 54 has a value of six, the actual address it points to is twelve because each base address location contains two motion vectors. Therefore, actual address twelve is where the Left motion vector of B0 is stored. Assume the inputs to Look-up Table 58 are: Block Number =1, OBMC/Prediction Mode= OBMC. Then the Left, Above, Right and Bottom OBMC motion vectors for Block C-1 will be retrieved as follows:

| MV Select | Location | LUT Out | Base Address | Final Address |
|---|---|---|---|---|
| Left | T-2 | +3 | 12 | 15 |
| Above | B-23 | +8 | 12 | 20 |
| Right | T-1 | +5 | 12 | 17 |
| Bottom | B-1 | −2 | 12 | 10 |

In the above example, FIG. 6 can be used to see that the OBMC Left motion vector for block one resides in the upper right block of macroblock C-2 memory location T-2. FIG. 7 or the above example can then be used to determine the offset. In this case, the Right motion vector of T-2 can be reached by modulo adding three. Likewise, with FIG. 6, it can be seen that the Right motion vector resides in the right side of memory segment T-1, the Above motion vector resides in the left side of memory segment B-23, and the Bottom motion vector resides in the left side of memory segment B-1.

Now that the apparatus and method of the present invention has been described for the encode operation, a description of the use of the present invention in decode operation will be provided. The decoder portion of FIG. 1 included Video D-A Converter and Encoder 26, post processor 24 and the Video Decoder 22.

Figure 8:
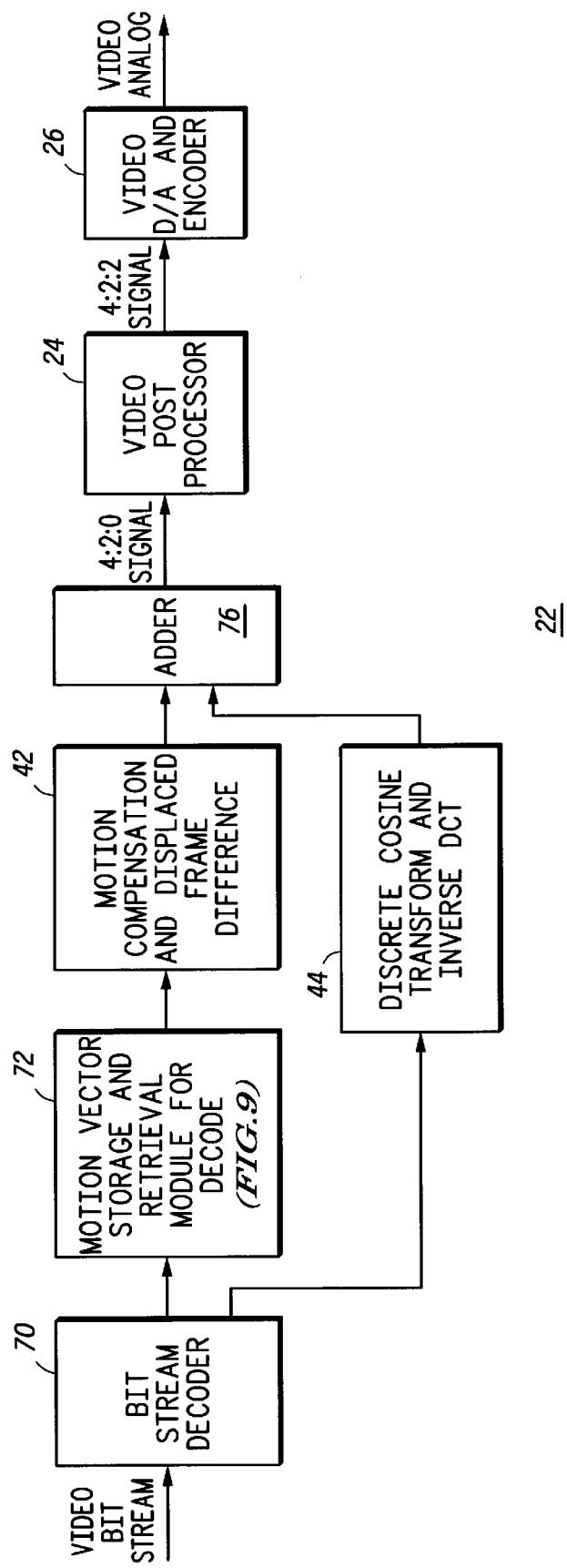
FIG. 8 illustrates in block diagram form a video decoder block diagram for use with the system of FIG. 1 in accordance with the present invention.

Illustrated in FIG. 8 are details of Video Decoder 22. The video bitstream is provided as an input to a Bitstream Decoder 70. Bitstream Decoder 70 has a first output which is connected to an input of a Motion Vector Storage and Retrieval Module for Decode 72. A second output of Bitstream Decoder 70 is connected to an input of Discrete Cosign Transform and Inverse DCT 44 which was previously illustrated in FIG. 2. An output of Motion Vector Storage and Retrieval Module for Decode 72 is connected to a Motion Compensation circuit 42 which was previously illustrated in connection with FIG. 2. An output of Motion Compensation circuit 42 is connected to a first input of a combiner circuit referred to as an Adder 76. An output of Discrete Cosign Transform and Inverse DCT 44 is connected to a second input of Adder 76. An output of Adder 76 provides a signal in video format 4:2:0. An output of Post Processor 24 is connected to an input of Video D/A and Encoder 26. A Post Processor 24 provides a signal in video format 4:2:2. An output of Video D/A and Encoder 26 provides a video analog signal which is the same signal illustrated in FIG. 1.

In operation, a digital video signal is input into Bitstream Decoder 70 which separates the motion vector differences and the pixel data from the video bitstream. The motion vector differences are provided to Motion Vector Storage and Retrieval Module for Decode circuit 72 which will be further illustrated in FIG. 9. The output motion vectors of decode circuit 72 are then provided to Motion Compensation circuit 42. After motion compensation is performed, the resulting pixels will subsequently be added by Adder 76 with an output from Discrete Cosign Transform and Inverse DCT circuit 44. The pixel data provided by Bitstream Decoder 70 is processed by Discrete Cosign Transform and Inverse DCT 44 to perform a transform base decompression. An output of Discrete Cosign Transform and Inverse DCT circuit 44 is provided as a second input to Adder 76. Adder 76 provides a signal in 4:2:0 video format to Post Processor 24 which performs post processing before a digital-to-analog conversion. D/A conversion is performed to provide the video analog output signal.

Figure 9:
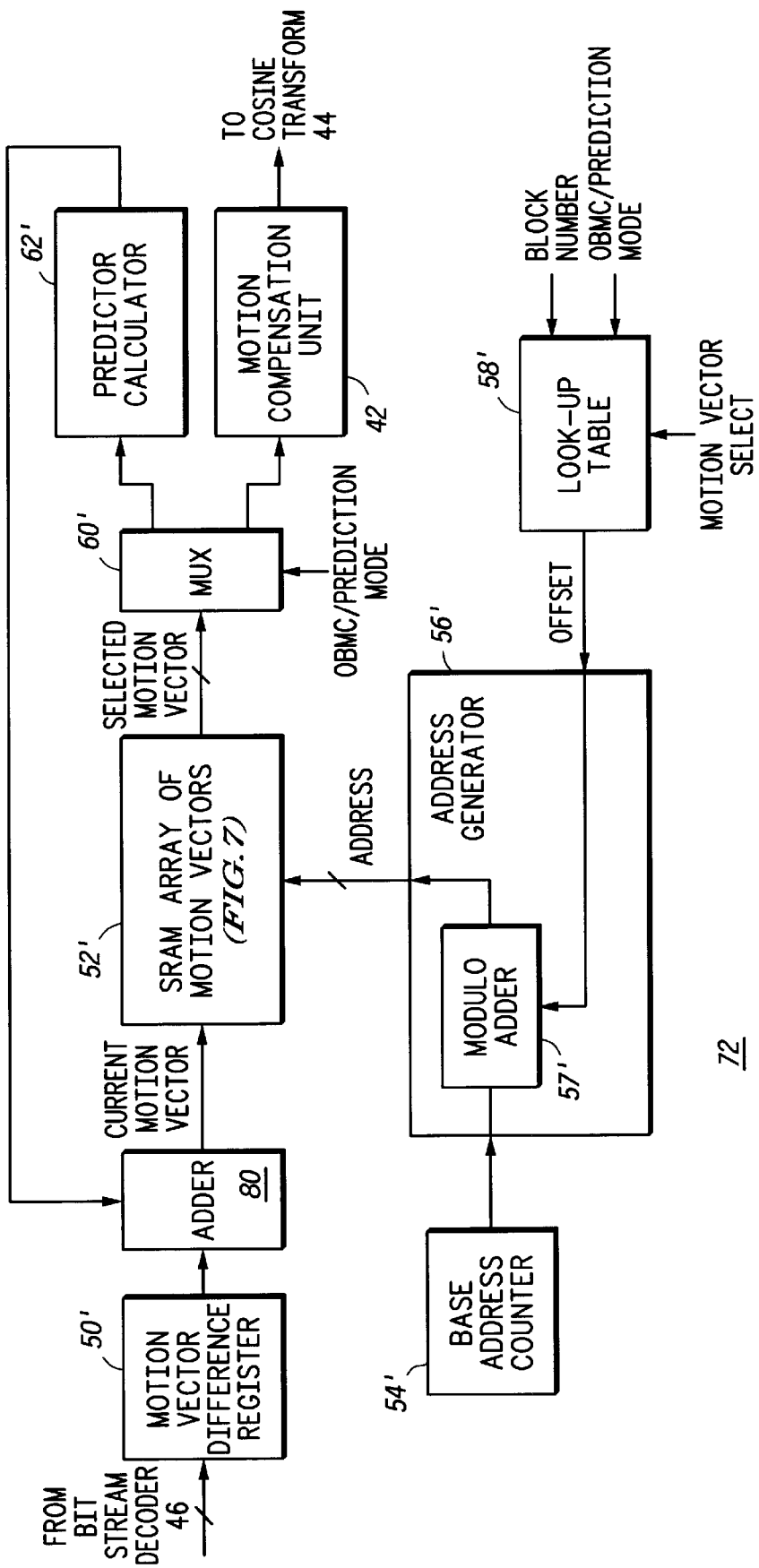
FIG. 9 illustrates in block diagram form the motion vector storage and retrieval circuitry for the decode function of FIG. 8.

Illustrated in FIG. 9 is the Motion Vector Storage and Retrieval Module for Decode circuit 72 of FIG. 8 in accordance with the present invention. The same reference numbers for the same elements in association with FIG. 3 will be used in FIG. 9, except a prime will be used to designate analogous circuitry which is readily duplicated for the illustrated hardware implementation. In other words, if no prime is used for the same numbered element, such as for Motion Compensation unit 42, the same element may readily be time-shared between the functions of FIG. 3 and FIG. 9. As a result of the similarity between FIG. 3 and FIG. 9, the major differences to be noted are the addition of an Adder circuit 80, which has a first input for receiving an output from the Motion Vector Register 50' and a second input for receiving an output from Predictor Calculator 62'. An output of Adder 80 provides a complete motion vector (sum of predictor and difference) which is used to be stored by the SRAM array of Motion Vectors 52'. The operation of Motion Vector Storage and Retrieval Module for Decode circuit 72 is analogous to the operation of Motion Vector Storage and Retrieval Module 38 of FIG. 2 and was previously described. Therefore, a detailed description of the operation of Motion Vector Storage and Retrieval Module for Decode circuit 72 will not be repeated. One noted exception to the analogous operation is that Motion Vector Difference Register 50' in the decode mode is actually storing a motion vector difference rather than a complete motion vector which register 50 of FIG. 3 was storing. Further, the motion vectors must be stored in the SRAM array of motion vectors 52' as in FIG. 3. To obtain the motion vector for storage in SRAM array 52', the predictor coming from Predictor Calculator 62' must be added with the motion vector difference coming out of Motion Vector Register 50' to obtain the motion vector for storage in SRAM Array of Motion Vectors 52'. The storage of these motion vectors forms a second plurality of motion vectors corresponding to a second macroblock.

By now it should be apparent that there has been provided an improved video motion system and method which efficiently retrieves and stores motion vectors. A method of storing motion vectors in a memory includes the steps of receiving four motion vectors, each corresponding to a first macroblock representing a portion of a video signal. The first and second motion vectors correspond to a top portion of the first macroblock, and the third and fourth motion vectors correspond to a bottom portion of the macroblock. The first and second motion vectors are stored in a first portion of the memory, and the third and fourth motion vectors are stored in a second portion of the memory. The present invention significantly reduces the amount of memory required to implement the SRAM array of Motion Vectors 52 and 52'. For example, assuming that there are 2 bytes per motion vector, it takes 192 bytes of RAM storage for the decoder portion of the video codec to perform the OBMC and Predictor functions. The 192 is calculated as follows:

[(24 macroblocks) (4 motion vectors/macroblock) (2 bytes/motion vector)]=192

Although 192 bytes of RAM appears to be the minimum RAM size required, significant savings are provided by the present invention. In particular, the present invention avoids saving or storing the motion vectors for the top of macroblocks which do not need to be saved past macroblock C-2 illustrated in FIG. 4. In other words, the two top blocks in each of macroblocks C-3, C-4, C-5 through C-23 are dropped (not stored). This space saving method results in the following memory size requirement:

[(24 macroblocks for bottom motion vectors) (2 motion vectors/macroblock)]=48 bottom motion vectors (3 macroblocks for top motion vectors) (2 motion vectors/macroblock)=6 top motion vectors Total Bytes=[(48+6) motion vectors] [2 bytes per motion vector]= 108 Bytes Since the predictor and OBMC functions must be performed on the encoder and decoder sides of the video codec, the total savings becomes 2(108) versus 2(192). In this particular example, use of the present invention results in a size savings of 216 bytes versus 384 bytes (approximately 44% savings) as previously calculated above. If the present invention were used with MPEG-4 for HDTV, the savings would be even greater due to the increased horizontal resolution. It should be noted that the dropping of blocks one and two after macroblock C-2 does not require a complex addressing methodology as a result of the inventive use of the memory allocation method disclosed herein. The present invention permits the OBMC and Predictor functions of the H.263 standard to share the same RAM without additional addressing hardware. By reducing required hardware, silicon area, cost and power consumption are all reduced which results in making hardware implementations of video codecs competitive with and even advantageous to software implementations.

Those skilled in the art will recognize that modifications and variations can be made without departing from the scope of the invention. For example, it should be well understood t hat various types of electronic memory may be implemented where the term "memory" has been described. Various logic gate configurations can be utilized to implement the method of the present invention. Therefore, it is intended that this invention encompass all such variations and modifications as fall within the scope of the appended claims.

What is claimed is:

1. An apparatus for storing and retrieving motion vectors used in decoding and encoding of video signals, the apparatus comprising:

a memory having a plurality of storage elements, a first of the plurality of storage elements storing a first motion vector for a macroblock of a video frame, the macroblock being one of a plurality of macroblocks representing a video frame, and a second of the plurality of storage elements storing a second motion vector for the macroblock, the first motion vector and the second motion vector being stored for a same macroblock, the first motion vector and the second motion vector being shared between both a motion vector predictor calculation and overlapped block motion compensation for video artifact removal; and address generation circuitry coupled to the memory, the address generation circuitry controlling location of where motion vectors are stored in the memory, wherein the memory and the address generation circuitry are implemented as hardware components in integrated circuit form.

2. The apparatus of claim 1 wherein the address generation circuitry further comprises:

a counter, the counter providing a base address; and a look-up table including a plurality of offset values, at least one of the plurality of offset values corresponding to a location in the memory of one of the first motion vector or the second motion vector, the look up table receiving a mode select signal, a block number within a predetermined macroblock, and a motion vector selection signal for selecting predetermined stored motion vectors within the memory.

3. The apparatus of claim 1, further comprising a predictor calculator responsive to the memory.

4. The apparatus of claim 1, wherein the first motion vector points to a top portion of the macroblock and the second motion vector points to a bottom portion of the macroblock.

5. The apparatus of claim 4, wherein the memory stores a plurality of motion vectors, a first set of the plurality of motion vectors corresponding to top portions of at least one macroblock and a second set of the plurality of motion vectors corresponding to bottom portions of the at least one macroblock, the first set of motion vectors occupying less storage elements in the memory than the second set of motion vectors.

6. A method of storing and retrieving motion vectors used in the decoding and encoding of video signals, comprising the steps of:

providing a memory;

receiving a first motion vector representing block one within a first macroblock and which is a Top Left block, a second motion vector representing block two within the first macroblock and which is a Top Right block, a third motion vector representing block three within the first macroblock and which is a Bottom Left block, and a fourth motion vector representing block four within the first macroblock and which is a Bottom Right block, the first macroblock representing a portion of a video frame, the first and second motion vectors representing a top portion of the first macroblock and the third and fourth motion vectors representing a bottom portion of the first macroblock; and storing the first and second motion vectors in a first portion of the memory and storing the third and fourth motion vectors in a second portion of the memory.

7. The method of claim 6, further comprising the step of selecting a first plurality of motion vectors for retrieval from the memory and performing a predictor function on the first plurality of motion vectors which is used to generate a second plurality of motion vectors, the second plurality of motion vectors representing a second macroblock, one or more of the second plurality of motion vectors being stored in the memory and overwriting at least one of the first plurality of motion vectors.

8. The method of claim 7, wherein the at least one of the second plurality of motion vectors represents a top portion of the second macroblock and overwrites one or more of the first plurality of motion vectors representing a bottom portion of the first macroblock.

9. The method of claim 7, wherein the at least one of the second plurality of motion vectors represents a bottom portion of the second macroblock and overwrites one or more of the first plurality of motion vectors representing a top portion of the first macroblock.

10. The method of claim 7 further comprising the step of:

forming a third plurality of motion vectors from a subset of the second plurality of motion vectors stored in the memory, the third plurality of motion vectors being used to perform overlapped block motion compensation (OBMC).

11. The method of claim 6, further comprising the steps of:
  receiving a first plurality of motion vectors from a motion estimator; and
  selecting a second plurality of motion vectors for retrieval from the memory and performing a predictor function on the second plurality of motion vectors to generate a motion vector difference for transmission over a video channel.

12. An apparatus for decoding video signals, the apparatus comprising:
  a bitstream decoder receiving a video signal;
  a motion vector storage and retrieval module responsive to the bitstream decoder, the motion vector storage and retrieval module including a memory storing a plurality of motion vectors representing a plurality of macroblocks, the plurality of macroblocks representing a portion of the video signal, wherein:
    a portion of the plurality of motion vectors in the memory represents a plurality of blocks within at least one predetermined macroblock, the at least one predetermined macroblock representing a portion of the video signal, wherein a first set of the portion of motion vectors corresponds to a top portion of the at least one predetermined macroblock and a second set of the portion of motion vectors corresponds to a bottom portion of the at least one predetermined macroblock, the first set of motion vectors requiring less memory storage than the second set of motion vectors;
  a transform based compression module responsive to the bitstream decoder;
  a motion compensation unit responsive to the motion vector storage and retrieval module; and
  a combiner responsive to the motion compensation unit and the transform based compression module.

13. The apparatus of claim 12, wherein a portion of the plurality of motion vectors in the memory represents a plurality of blocks within at least one predetermined macroblock, the at least one predetermined macroblock representing a portion of the video signal, wherein a first set of the portion of motion vectors corresponds to a top portion of the at least one predetermined macroblock and a second set of the portion of motion vectors corresponds to a bottom portion of the at least one predetermined macroblock, the first set of motion vectors requiring less memory storage than the second set of motion vectors.

14. An apparatus for decoding video signals, the apparatus comprising:
  a bitstream decoder receiving a video signal;
  a motion vector storage and retrieval module responsive to the bitstream decoder, the motion vector storage and retrieval module including a memory storing a plurality of motion vectors representing a plurality of macroblocks, the plurality of macroblocks representing a portion of the video signal, wherein the motion vector and retrieval module comprises:
    a motion difference vector register;
    an adder responsive to the motion difference vector register;
    a counter,
    an address generator responsive to the counter, wherein the memory is responsive to the adder and responsive to the address generator, the memory having a plurality of storage elements, a first of the plurality of storage elements storing a first motion vector for a macroblock, the macroblock comprising one of the plurality of macroblocks, and a second of the plurality of storage elements storing a second motion vector for the macroblock;
    a look up table including a plurality of offset values, at least one of the plurality of offset values corresponding to a location in memory of one of the first and second motion vectors and wherein the look up table receives a mode select signal, a block number within a predetermined macroblock, and a motion vector selection signal for selecting predetermined stored motion vectors within the memory; and
    a predictor calculator responsive to the memory;
  a transform based compression module responsive to the bitstream decoder;
  a motion compensation unit responsive to the motion vector storage and retrieval module; and
  a combiner responsive to the motion compensation unit and the transform based compression module.

15. The apparatus of claim 14, wherein the address generator receives a base address from the counter and receives an offset from the look up table and performs module addition on the base address and the offset to provide an address signal to the memory.

16. The apparatus of claim 14, wherein the predictor calculator is coupled to the memory via a multiplexer, the multiplexer responsive to the operation mode select signal.

17. An apparatus for encoding a video signal, the apparatus comprising:
  a motion estimation module;
  a motion vector storage and retrieval module responsive to the motion estimation module, the motion vector storage and retrieval module including a memory storing a plurality of motion vectors corresponding to a macroblock, the macroblock representing a portion of the video signal, wherein the motion vector storage and retrieval module further comprises:
    a motion vector register;
    a counter;
    an address generator responsive to the counter, wherein the memory is responsive to the address generator, the memory having a plurality of storage elements, a first of the plurality of storage elements storing a first motion vector for a macroblock, the macroblock comprising one of the plurality of macroblocks, and a second of the plurality of storage elements storing a second motion vector for the macroblock;
    a look up table including a plurality of offset values, at least one of the plurality of offset values corresponding to a location in memory of one of the first and second motion vectors and wherein the look up table receives a mode select signal, a block number within a predetermined macroblock, and a motion vector selection signal for selecting predetermined stored motion vectors within the memory; and
    a predictor calculator responsive to the memory; and
  a motion compensation unit responsive to the motion vector storage and retrieval module;
  a transform based compression module responsive to the motion compensation unit; and
  a bitstream encoder responsive to the transform based compression module.

18. An apparatus for encoding a video signal, the apparatus comprising:

a motion estimation module;

a motion vector storage and retrieval module responsive to the motion estimation module, the motion vector storage and retrieval module including a memory storing a plurality of motion vectors corresponding to a macroblock, the macroblock representing a portion of the video signal, wherein a portion of the plurality of motion vectors in the memory represents a plurality of blocks within at least one predetermined macroblock, the at least one predetermined macroblock representing a portion of the video signal, wherein a first set of the portion of motion vectors corresponds to a top portion of the at least one predetermined macroblock and a second set of the portion of motion vectors corresponds to a bottom portion of the at least one predetermined macroblock, the first set of motion vectors requiring less memory storage than the second set of motion vectors;

a motion compensation unit responsive to the motion vector storage and retrieval module;

a transform based compression module responsive to the motion compensation unit; and a bitstream encoder responsive to the transform based compression module.

19. An apparatus for decoding video signals, the apparatus comprising:

a bitstream decoder receiving a video signal;

a motion vector storage and retrieval module responsive to the bitstream decoder, the motion vector storage and retrieval module including a memory storing a plurality of motion vectors representing a plurality of macroblocks, the plurality of macroblocks representing a portion of the video signal;

a selection unit having a first input to receive at least one of the plurality of motion vectors from the motion vector storage and retrieval module and a second input to receive an operation mode select signal;

a predictor calculator coupled to a first output of the selection unit for performing a predictor calculation using the at least one of the plurality of motion vectors when the operation mode select signal has a first state;

a motion compensation unit coupled to a second output of the selection unit for performing a motion compensation calculation using the at least one of the plurality of motion vectors when the operation mode select signal has a second state;

a transform based compression module responsive to the bitstream decoder;

a motion compensation unit responsive to the motion vector storage and retrieval module; and a combiner responsive to the motion compensation unit and the transform based compression module.

20. The apparatus of claim 17, wherein the motion vector storage and retrieval module provides at least one of the plurality of motion vectors as a motion vector used in performing one of a predictor calculation or a motion compensation calculation, the one of the predictor calculation or motion compensation calculation being performed in response to an operation mode select signal.

21. The apparatus of claim 18, wherein the motion vector storage and retrieval module provides at least one of the plurality of motion vectors as a motion vector used in performing one of a predictor calculation or a motion compensation calculation, the one of the predictor calculation or motion compensation calculation being performed in response to an operation mode select signal.

* * * * *